Oct. 12, 1937.  R. RIBEROLLES  2,095,716
MEASUREMENT APPARATUS
Filed Nov. 29, 1935
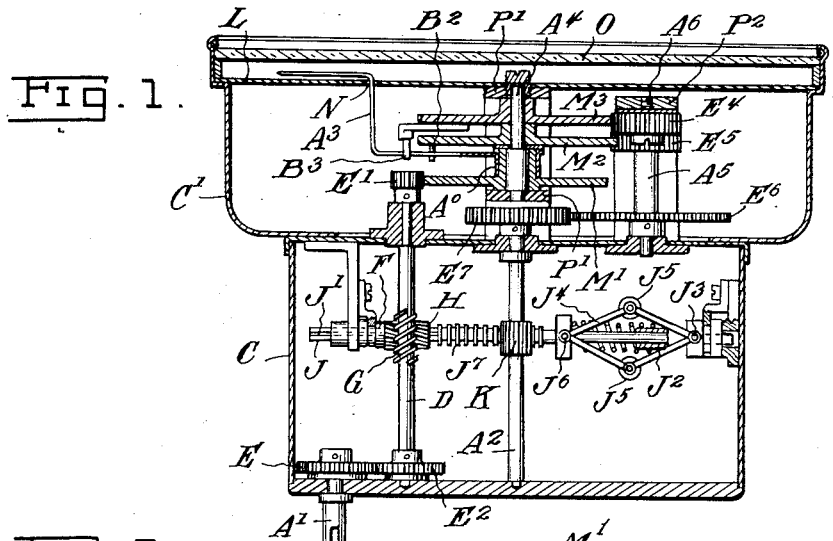
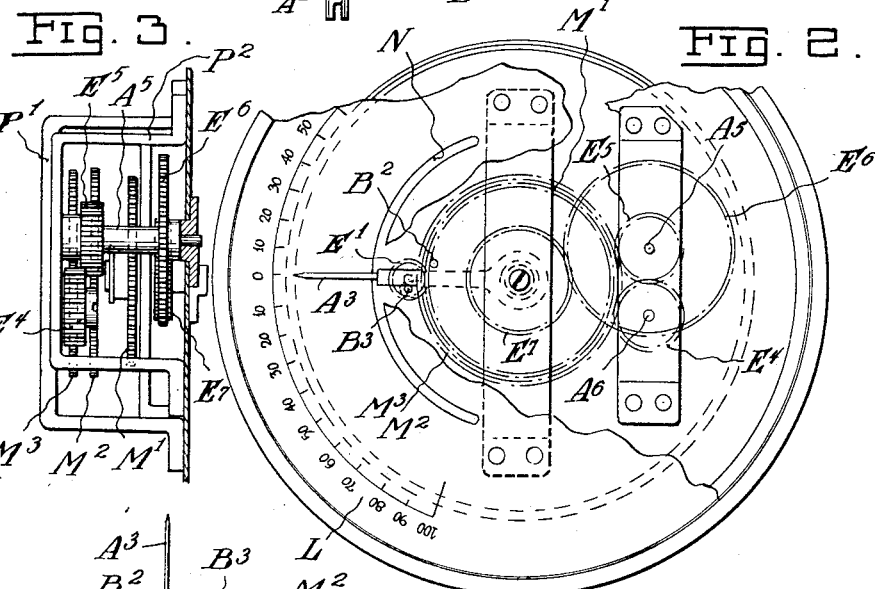
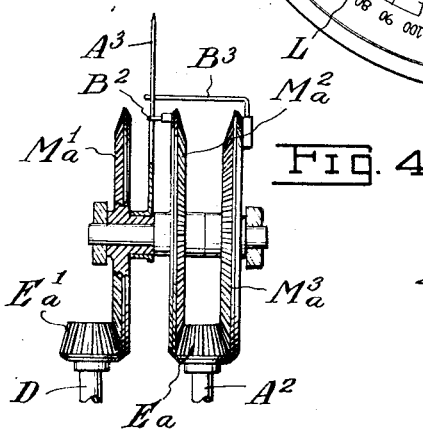
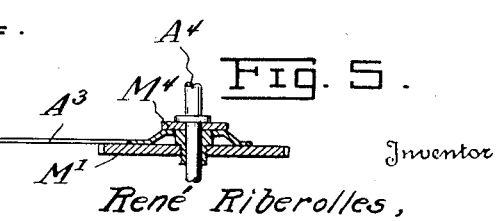
Inventor
René Riberolles,
By
Attorneys Patented Oct. 12, 1937

2,095,716

UNITED STATES PATENT OFFICE 2,095,716

MEASUREMENT APPARATUS

René Riberolles, Saint-Cloud, France

Application November 29, 1935, Serial No. 52,117
In Belgium December 1, 1934

7 Claims. (Cl. 264—1)

The present invention relates to measurement apparatus intended to measure the characteristic quantities of phenomena capable of occurring either in one direction or in the opposite, and it is more especially, although not exclusively, concerned with apparatus of this kind for measuring the speeds of any elements or mechanisms capable of running in either of two opposite directions.

The object of the present invention is to provide an apparatus of the kind above referred to which is capable of measuring these quantities not only in magnitude but also in direction.

According to an essential feature of the present invention my apparatus includes at least one indicating element or device combined with a single device for measuring the quantity in question (speed of revolution for instance) that said indicating element has its movement conjugated automatically, that is to say according to the direction of the quantity to be measured, with that of one or the other of two elements driven by said measurement device in such manner that the respective deviations of said elements from a zero position are, at any time, opposed in direction while having a magnitude that is in accordance with the value of the quantity to be measured, being for instance proportional to said value.

Other features of the present invention will result from the following detailed description of some specific embodiments thereof.

Preferred embodiments of the present invention will be hereinafter described, with reference to the accompanying drawing, given merely by way of example, and in which:

Fig. 1 is a sectional view of an apparatus for measuring the speed of revolution of a shaft or other member, both in magnitude and in direction, said apparatus being made according to the present invention;

Fig. 2 is a plan view with parts broken away of a device for driving elements of said apparatus;

Fig. 3 is a side view of the driving elements from the right hand side of Fig. 1;

Fig. 4 is a view of a modification of said driving arrangement;

Fig. 5 is a sectional view of a device for frictionally driving the indicating member of the device according to the present invention, this frictional driving device constituting a modification of the arrangement shown in Fig. 1.

In the drawing I have shown a device which is intended to measure the speed of a mechanism capable of running in opposite directions, that is to say either in the forward or in the reverse direction. The apparatus according to the invention must give different indications of said speed according as said mechanism is running in one direction or in the opposite one. But it should be well understood that it is merely by way of example that the quantity to be measured is the speed of a mechanism.

This apparatus includes, on the one hand, a single measurement device, of any conventional or other type, capable of measuring the magnitude of the speed in question. For instance, this device consists of a speedometer C (Fig. 1) the mechanism of which is actuated through an input or driving shaft $A^1$ and transmits displacements, always in the same direction and proportional to the magnitude of the speed to be measured, to an element such as a driven shaft $A^2$. This shaft $A^2$ is the shaft which, in usual speedometers, actuates the indicating member so that the angle made by said member with a predetermined direction, always on the same side of said direction, indicates the magnitude of the speed, irrespective of the direction thereof. The mechanism above referred to may be of any kind whatever, for instance a centrifugal integrator, etc.

The apparatus according to the invention further includes an indicating member $A^3$. In the following description, it will be supposed that there is provided a single indicating member, although the invention also covers the case in which a single speedometer would control two indicating members in such manner that one or the other of said members is actuated in a suitable manner according to the direction of revolution of the driving shaft $A^1$.

This indicating member $A^3$ is connected to the speedometer in such manner that, according to the direction of rotation of shaft $A^1$, member $A^3$ has its displacement conjugated with one or the other of two elements driven by the speedometer, that is to say by driven shaft $A^2$, the respective deviations, at any time, of said elements taking place in opposite directions but being always in accordance with the magnitude of the speed to be measured, being for instance proportional thereto. According to the invention, the coefficient of proportionality may be either the same for both of these elements or different for each of them, respectively.

In the example illustrated by the accompanying drawing, this result is obtained by means of the following arrangement:

The indicating member $A^3$ is frictionally connected, for instance directly as shown in the drawing, with a part driven by driving shaft $A^1$. In the example shown by the drawing, the indicating member consists of a needle or pointer. This frictional connection therefore determines the direction of the deviation indicated by member $A^3$.

As for the elements which are to determine the amplitude of this deviation, they consist of stops $B^2$ and $B^3$, one of which limits the displacement imparted by shaft $A^1$, through frictional means, to indicating member $A^3$.

The frictional driving system is, for instance, made as follows:

I provide a kinematic system operatively driven by shaft $A^1$ and a transmission, including friction means, between one of the elements of said system and pointer $A^3$. In the examples illustrated by the drawing, the transmission is interposed directly between pointer $A^3$ and a movable part $M^1$.

The shaft $A^1$ through gear $E^3$ drives a gear $E^2$ on a shaft D. This shaft carries at its upper end a gear $E^1$ which meshes with gear teeth on the periphery of disc $M^1$. In this manner the disc $M^1$ is driven in the same direction as shaft $A^1$, and imparts to pointer $A^3$ a motion in a corresponding direction.

In the embodiment shown by Fig. 1, the base, or central portion $A^0$, of pointer $A^3$ is mounted with a friction fit on disc $M^1$, or rather with a cylindrical projection coaxial with said disc and integral therewith. This arrangement is particularly intended for the case in which the axis of the speedometer is vertically disposed. Pointer $A^3$ and disc $M^1$ are for instance mounted loose on a stationary spindle $A^4$ carried by a support P and the central tubular portion of the pointer bears upon the surface of said disc $M^1$.

Another embodiment of this device is shown, by way of example, by Fig. 5. In this case, the central portion of pointer $A^3$, that is to say the portion thereof that is to be mounted about the axis of rotation of said pointer is elastically held between two discs one of which is constituted by plate $M^1$ while the other one $M^4$ may be rigidly fixed to said disc $M^1$. This embodiment is more especially adapted to the case in which the axis of the counter is horizontally disposed. The elastic tightening of the base of the needle or pointer may be obtained, for instance, either by means of a spring, or again by suitably shaping the metal that constitutes said base of the pointer.

I will now describe the means for controlling the angular position of stops $B^2$ and $B^3$ according to a predetermined law, said means consisting of any kinematic system capable of imparting deviations in opposite directions to said stops in response to displacements of the shaft $A^2$.

The shaft D driven by shaft $A^1$ carries a worm G engageable with a second worm H which is splined on a shaft J through a pin F engaging in a groove $J^1$ in shaft J. In this manner shaft J is capable of moving longitudinally with respect to worm H while being continuously driven thereby. One end of the shaft J is journalled in a sleeve $J^2$, in such a manner as to slide therein while continuously rotating therewith. The sleeve member $J^2$ carries pins $J^3$ acting as pivots for the ends of the arm $J^4$ of a centrifugal governor having masses or weights $J^5$. The other arms $J^4$ of the governor are pivoted at $J^6$ to the shaft J. A rack $J^7$ formed on the shaft J is in engagement with a gear K fixed on a vertical shaft $A^2$.

It is evident that upon rotation of the shaft $A^1$ this rotation will be imparted to the shaft J. As the speed varies, the weights $J^5$ will shift the shaft J longitudinally, and this movement will impart motion to the shaft $A^2$ proportional to the speed of the shaft $A^1$. The shaft $A^2$ will be moved through the same amount and in the same direction whatever be the direction of rotation of the shaft $A^1$.

At its upper end the shaft $A^2$ carries a gear $E^7$ which meshes with a gear $E^6$ rigid on a shaft $A^5$. Shaft $A^5$ carries at its upper end a gear $E^5$ which meshes with the periphery of a disc $M^2$. Gear $E^5$ also meshes with a gear $E^4$ of the same diameter, which is spaced slightly higher and itself meshes with the periphery of a disc $M^3$, so that the disc $M^3$ is driven in the opposite direction from disc $M^2$. Shaft $A^5$ and shaft $A^6$ which carries gear $E^4$ are mounted in a frame $P^2$, while shaft $A^4$, which rotatably supports disc $M^1$, $M^2$ and $M^3$, is mounted in a frame member $P^1$.

Since the stops $B^2$ and $B^3$ are carried by discs $M^2$ and $M^3$, and since these two discs will be shifted in opposite directions by amounts proportional to the speed of shaft $A^1$, it is evident that pointer $A^3$ will be moved in one direction or the other until it engages the stops and there will be held in a position to indicate both the speed and the direction of such speed.

Fig. 4 shows a modified form of drive, including shafts D and $A^2$ corresponding to those shown in Fig. 1 and driven in the same manner. Shaft D drives through gear $Ea^1$ a disc $Ma^1$ corresponding to disc $M^1$, and frictionally driving the pointer $A^3$. Shaft $A^2$ through gear Ea drives in opposite directions the parallel discs $Ma^2$ and $Ma^3$, to which are secured the stops $B^2$ and $B^3$. It is evident that the stops will be moved in opposite directions by amounts proportional to the speed, and the pointer will be shifted to engage one or the other of these stops.

In the embodiment shown by the drawing, the angular displacements of discs $M^2$ and $M^3$ are of equal displacements. This is not a necessary condition, and the ratios of the gears might be modified in order to have different angular displacements of these parts.

The apparatus above described, whatever be the embodiment that is chosen, works in such manner that pointer $A^3$ (or eventually the element through which it is controlled) is frictionally driven by movable part $M^1$ in a direction which depends upon the direction of revolution of the driving shaft $A^1$ and which changes together with it. At the same time, the mechanism works to move stops $B^2$ and $B^3$ in opposite directions from their zero positions, proportionally with the speed of shaft $A^1$. It follows that the angular deviation of pointer $A^3$, which is necessarily stopped by either of the elements $B^2$ and $B^3$, is proportional to the speed of revolution of shaft $A^1$ and takes place in one direction or in the opposite one according as said shaft $A^1$ is revolving in one direction or in the opposite one, respectively.

Accordingly, the indicating apparatus according to the invention shall permit of knowing not only the magnitude of the speed of revolution of the driving shaft but also the direction in which it is revolving.

Of course the invention applies to devices of the kind above described in which the means for moving at least one pointer or needle in one direction or in the opposite one are of any kind whatever.

Finally it also includes the case in which the transmission between the control element of the pointer, which moves between stops B² and B³, and said pointer proper includes speed reducing or multiplying means, in the case in which such a control element is provided.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device of the type described which comprises, in combination, a driving shaft, an indicating member, mechanism operatively connected to and arranged to measure the speed of rotation of said driving shaft, means operatively connected to said driving shaft for yieldingly driving said indicating member in one direction or the other according to the direction of rotation of said driving shaft, and two means, operative by said mechanism in opposite directions respectively, capable of controlling the amplitude of the displacements of said indicating member according to the magnitude of the speed of said driving shaft, whereby said indicating member always cooperates with one of said means.

2. A device of the type described, which comprises, in combination, a driving shaft, an angularly movable indicating member, a mechanism operatively connected to and arranged to measure the speed of rotation of said driving shaft, means operatively connected to said driving shaft and including a friction connection for yieldingly rotating said indicating member in one direction or the other according to the direction of rotation of said driving shaft, two movable stops, one on either side of said indicating member, capable of limiting the angular displacement of said indicating member in one direction or the other respectively, and means operative by said mechanism for imparting to said stops angular displacements concentric with those of said indicating member in opposite directions respectively and of amplitudes proportional to the speed of said driving shaft.

3. A speedometer adapted to indicate both the magnitude and the direction of the speed of revolution of a revolving element, which comprises, a pointer movable angularly about an axis, a mechanism capable of measuring the magnitude of said speed of revolution, including a driving shaft adapted to be coupled with said revolving element and a driven shaft rotatable in accordance with the magnitude of said speed of revolution, means, including a frictional transmission, for yieldingly connecting said pointer with said driving shaft, whereby said pointer is turned in one direction or the opposite one according to the direction of revolution of said revolving element, respectively, two movable stops displaceable angularly in concentric relation with said pointer, one on either side of said pointer, and means, operative by said mechanism, for giving said stops angular displacements in opposite directions respectively of amplitudes proportional to the value of said speed of revolution.

4. A speedometer according to claim 3 in which said shafts are vertically disposed, in which said means for yieldingly connecting said pointer with said driving shaft include a vertical stationary spindle, a horizontal disc mounted loose on said spindle, means for angularly connecting said disc with said driving shaft, whereby the revolution movement of said driving shaft is transmitted to said disc, and a sleeve rigid with said pointer coaxially surrounding said spindle and free to rotate with respect thereto, whereby said sleeve rotates about said spindle, said sleeve frictionally engaging said disc.

5. A speedometer according to claim 3 in which said shafts are horizontally disposed, in which said means for yieldingly connecting said pointer with said driving shaft include a horizontal stationary spindle the axis of which is the line about which said pointer is rotatable, a vertical disc mounted loose on said spindle, means for angularly connecting said disc with said driving shaft, whereby the revolution movement of said driving shaft is transmitted to said disc, and means for elastically applying the part of said pointer close to said spindle against said disc.

6. A speedometer according to claim 3, in which said last means comprises a shaft adapted to be turned by said mechanism through an amplitude proportional to the speed of revolution, a gear on said shaft and a pair of gears mounted to turn about axes arranged at angles to the axis of said shaft connected to said stops and engaging opposite sides of said first gear and driven thereby in opposite directions.

7. A speedometer adapted to indicate both the magnitude and the direction of the speed of revolution of a revolving element, which comprises, a mechanism capable of measuring the magnitude of said speed of revolution, including a driving shaft coupled with said revolving element and a driven shaft rotatable in accordance with the magnitude of the speed of said revolving element, two means connected to said driven shaft in such a manner as to be displaced in different directions by amounts proportional to the speed of rotation of said revolving element, one of said means corresponding to the forward or clockwise and the other means corresponding to the rearward or counterclockwise direction of rotation of said revolving element, and means operatively connected to said revolving element to indicate which of said last two means corresponds to the actual direction of rotation of the revolving element.

RENÉ RIBEROLLES.